United States Patent
Biittig et al.

(10) Patent No.: US 11,192,973 B2
(45) Date of Patent: Dec. 7, 2021

(54) COMPOSITIONS AND PROCESS FOR STABILIZING PHENOLIC RESINS CONTAINING CALIXARENES

(71) Applicant: SI GROUP, INC., Schenectady, NY (US)

(72) Inventors: Ricky Biittig, Schenectady, NY (US); Matthew Meketa, Schenectady, NY (US)

(73) Assignee: SI GROUP, INC., Schenectady, NY (US)

( * ) Notice: Subject to any disclaimer, the term of this patent is extended or adjusted under 35 U.S.C. 154(b) by 0 days.

(21) Appl. No.: 17/116,128

(22) Filed: Dec. 9, 2020

(65) Prior Publication Data

US 2021/0102024 A1 Apr. 8, 2021

Related U.S. Application Data

(62) Division of application No. 15/879,245, filed on Jan. 24, 2018, now Pat. No. 10,889,677.

(60) Provisional application No. 62/450,288, filed on Jan. 25, 2017, provisional application No. 62/529,343, filed on Jul. 6, 2017.

(51) Int. Cl.
| C08L 65/02 | (2006.01) |
| C08G 8/36 | (2006.01) |
| C08G 8/12 | (2006.01) |
| B01D 17/04 | (2006.01) |
| C10G 33/04 | (2006.01) |
| C08L 61/14 | (2006.01) |

(52) U.S. Cl.
CPC ............ *C08G 8/36* (2013.01); *B01D 17/047* (2013.01); *C08G 8/12* (2013.01); *C08L 61/14* (2013.01); *C10G 33/04* (2013.01); *C10G 2300/1033* (2013.01)

(58) Field of Classification Search
CPC ... C08G 8/36; C08G 8/12; C08G 8/28; B01D 17/047; C08L 65/02; C08L 2205/025; C08L 61/14
See application file for complete search history.

(56) References Cited

U.S. PATENT DOCUMENTS

| 4,032,514 A | 6/1977 | Buriks et al. |
| 4,046,521 A | 9/1977 | Bessler et al. |
| 4,259,464 A | 3/1981 | Buriks et al. |
| 5,039,437 A | 8/1991 | Martella et al. |
| 5,138,883 A | 8/1992 | Paquet et al. |
| 5,205,964 A | 4/1993 | Stephenson et al. |
| 5,272,226 A | 12/1993 | Lancaster et al. |
| 5,318,883 A * | 6/1994 | Yamanaka .............. C07C 39/17 430/108.1 |
| 6,399,549 B1 | 6/2002 | Taylor et al. |
| 6,984,599 B2 | 1/2006 | Nagy |
| 7,425,602 B2 | 9/2008 | Howard et al. |
| 7,514,197 B2 | 4/2009 | Ochiai et al. |
| 7,524,469 B2 | 4/2009 | Meikrantz et al. |
| 2012/0145542 A1 | 6/2012 | Nakamura et al. |
| 2012/0172270 A1 | 7/2012 | Dilsky |
| 2015/0184086 A1 | 7/2015 | Rankin et al. |
| 2016/0108231 A1* | 4/2016 | Aube ...................... C08G 8/28 525/534 |
| 2017/0292657 A1 | 10/2017 | Kundu |

FOREIGN PATENT DOCUMENTS

| EP | 0450874 A2 | 10/1991 |
| EP | 0461554 A1 | 12/1991 |
| GB | 1167427 | 10/1969 |
| GB | 2305437 A | 4/1997 |

OTHER PUBLICATIONS

Gutsche, "Calixarenes," Acc. Chem. Res. 16: 161-170 (1983).
Patrick et al., "An Improved Preparation of Phenolic [1.1.1.1]Metacyclophanes," J. Org. Chem. 42: 382-383 (1977).
Gutsche et al., "p-tert-Butylcalix[4]Arene," Organic Syntheses, Coll. 8: 75 (1993) and 68: 234 (1990).

* cited by examiner

*Primary Examiner* — Robert D Harlan
(74) *Attorney, Agent, or Firm* — Jeffrey N. Townes; Cozen O'Connor

(57) ABSTRACT

This invention relates to compositions and a process for stabilizing or solubilize a phenolic resin containing a mixture of linear phenolic resins and calixarenes. The process comprises contacting the phenolic resin with an epoxide, to at least partially alkoxylate the phenolic hydroxyl groups of the calixarenes. This process forms a stabilized or solubilized phenolic resin with an increased solubility in a hydrocarbon solvent.

18 Claims, No Drawings

COMPOSITIONS AND PROCESS FOR STABILIZING PHENOLIC RESINS CONTAINING CALIXARENES

This application is divisional application of U.S. patent application Ser. No. 15/879,245, filed Jan. 24, 2018, which claims priority to U.S. Provisional Application No. 62/450,288, filed on Jan. 25, 2017 and U.S. Provisional Application No. 62/529,343, filed on Jul. 6, 2017; all of which are herein incorporated by reference in their entirety.

FIELD OF THE INVENTION

This invention generally relates to a resin comprising modified calixarene compounds. This invention also generally relates to a process for preparing a phenolic resin. The invention also relates to a demulsifier composition comprising the phenolic resins.

BACKGROUND

Phenolic resins have been used as components of demulsifier and dehazer formulations, e.g., in oilfield, refining, and fuel applications. These resins are useful for the efficient separation of emulsions, e.g., separating oil from water. Depending how the phenolic resins are prepared, the phenolic resin may contain mainly linear phenolic resins or a mixture of linear phenolic resins and cyclic phenolic resins (e.g., calixarenes). For instance, certain oil field resins can contain 20% or more calixarenes.

It is advantageous to use phenolic resins containing a mixture of linear phenolic resins and cyclic phenolic resins because the linear/cyclic phenolic resin mixture is a more efficient demulsifier in certain oil emulsions compared to the phenolic resin containing mainly linear phenolic resins.

However, using the phenolic resins containing the linear/cyclic phenolic resin mixture can lead to the instability (or insolubility) problems associated with the product. When the phenolic resin containing such a mixture is prepared, significant amounts of insolubles will typically precipitate out of the resin solution. Thus, the final product can settle, forming a cake at the bottom of the container, that when stored for even a short period of time, makes it difficult to be processed further. To obviate this problem, the resin material can be made and shipped hot, provided that it is transported only short distances. However, this solution can significantly limit the utilization of the phenolic resin product.

Therefore, there is a need in the art to develop phenolic resins containing a mixture of linear and cyclic phenolic resins with improved solubility and stability in a hydrocarbon solvent. There is also a need in the art to develop a process to stabilize (or solubilize) phenolic resins containing a mixture of linear and cyclic phenolic resin to improve the solubility and stability of the phenolic resins in a hydrocarbon solvent. This invention answers those needs.

SUMMARY OF THE INVENTION

One aspect of the invention relates to a resin comprising one or more modified calixarene compounds, each calixarene compound comprising 4-20 units of formula (I) and/or formula (II):

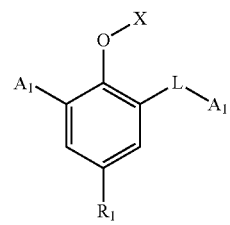

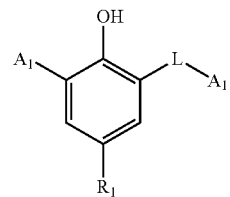

wherein:

each X is independently

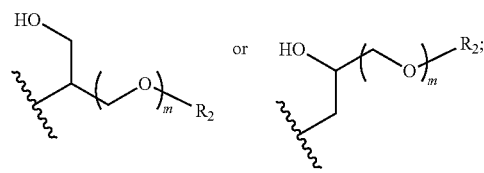

each $R_1$ is independently a H, $C_1$ to $C_{30}$ alkyl, phenyl, or arylalkyl;

each $R_2$ is independently a H, $C_1$ to $C_{20}$ branched or unbranched alkyl which may optionally be substituted with one or more glycidyl ether units of the formula

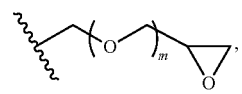

$C_2$ to $C_{10}$ alkenyl, or $C_5$ to $C_{10}$ aryl;

each L is independently selected from the group consisting of —$CH_2$—, —C(O)—, —CH($R_3$)—, —$(CH_2)_n$—O—$(CH_2)_n$—, —C($R_3$)$_2$—, and —S—;

each $R_3$ is independently a $C_1$-$C_6$ alkyl;

each m is independently an integer from 0 to 10, for instance, from 0 to 3;

each n is independently an integer from 1 to 2;

each $A_1$ represents a direct covalent bond to an adjacent unit of formula (I) or formula (II) such that there is one L group between adjacent units, whereby the total units in the calixarene compound form a ring; and wherein units of formula (I) make up from about 35% to 100% of the overall units present in the calixarene compound.

Another aspect of the invention relates to a resin solution of a phenolic resin, comprising one or more modified calixarene compounds. Each calixarene compound comprises 4-20 units of formula (I'),

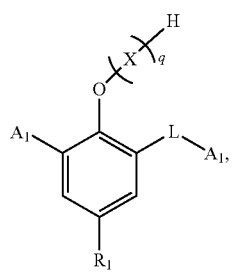

and/or formula (II),

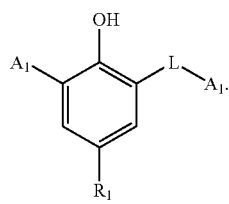

Each X is independently the same or different moiety, each moiety having a structure of

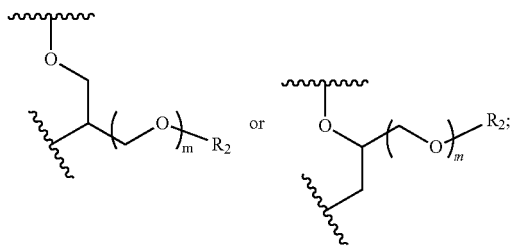

each $R_1$ is independently a H, $C_1$ to $C_{30}$ alkyl, phenyl, or arylalkyl; each $R_2$ is independently a H, $C_1$ to $C_{20}$ branched or unbranched alkyl which may optionally be substituted with one or more glycidyl ether units of the formula

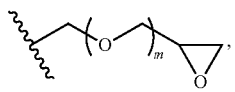

$C_2$ to $C_{10}$ alkenyl, or $C_5$ to $C_{10}$ aryl; each L is independently selected from the group consisting of —$CH_2$—, —C(O)—, —CH($R_3$)—, —($CH_2$)$_n$—O—($CH_2$)$_n$—, —C($R_3$)$_2$—, and —S—; each $R_3$ is independently a $C_1$-$C_6$ alkyl; each m is independently an integer from 0 to 10; each n is independently an integer from 1 to 2; each q is independently an integer from 1 to 100; and each $A_1$ represents a direct covalent bond to an adjacent unit of formula (I) or formula (II) such that there is one L group between adjacent units, whereby the total units in the calixarene compound form a ring. The units of formula (I') make up from about 35% to 100% of the overall units present in the calixarene compound. The phenolic resin is soluble in a hydrocarbon solvent having a concentration of about 50 wt % to about 75 wt %.

In one embodiment, units of formula (I') make up from about 50% to about 90% of the overall units present in the calixarene compound.

In some embodiments, each m is independently an integer from 0 to 3.

In some embodiments, each m is 1. In one embodiment, each $R_2$ is independently selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. For instance, each $R_2$ is n-butyl. In one embodiment, each $R_1$ is independently a $C_4$ to $C_{12}$ alkyl or $C_{24}$ to $C_{28}$ alkyl. For instance, each $R_1$ is independently tert-butyl, nonyl, or tert-octyl. In one embodiment, the total number of units in the calixarene compounds is from 4 to 8.

In some embodiments, each q is independently an integer from 1 to 20. In one embodiment, q is 1 in one or more units in the modified calixarene compounds.

In some embodiments, the one or more modified calixarene compounds have one or more units of formula (I') represented by the structure of

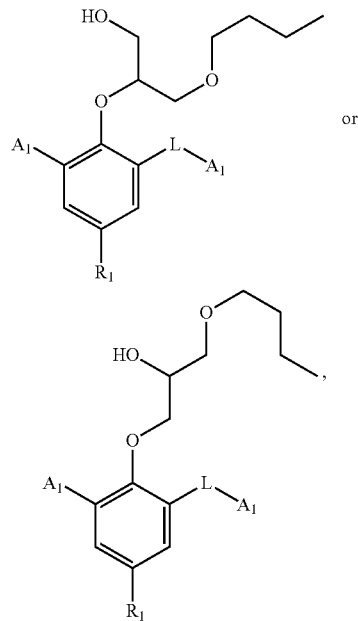

wherein:
each $R_1$ is independently a $C_4$ to $C_{12}$ alkyl;
each L is independently selected from the group consisting of —$CH_2$—, —C(O)—, —CH($R_3$)—, —($CH_2$)$_n$—O—($CH_2$)$_n$—, and —C($R_3$)$_2$—;
each $R_3$ is independently a $C_1$-$C_6$ alkyl;
each n is independently an integer from 1 to 2; and
the total number of units in the calixarene compounds is from 4 to 8.

In one embodiment, each $R_1$ is independently tert-butyl, nonyl, or tert-octyl. In one embodiment, each L is independently —$CH_2$— or —$CH_2$—O—$CH_2$—. In one embodiment, units of formula (I') make up from about 50% to about 90% of the overall units present in the calixarene compound.

In some embodiments, each m is 0. In one embodiment, each $R_2$ is independently selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. For instance, each $R_2$ is phenyl. In one embodiment, each $R_1$ is independently a $C_4$ to $C_{12}$ alkyl. In one embodiment, each $R_1$ is independently a $C_{24}$ to $C_{28}$ alkyl. In one embodiment, the total number of units in the calixarene compounds is from 4 to 8.

In some embodiments, each m is 1. In one embodiment, each $R_2$ is a $C_1$ to $C_{20}$ branched or unbranched alkyl substituted with one or more glycidyl ether units of the formula

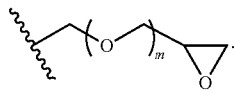

In one embodiment, each $R_2$ is a $C_1$ to $C_8$ branched or unbranched alkyl substituted with one or more glycidyl ether units of the formula

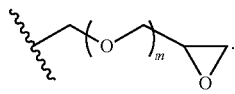

For instance, each $R_2$ is

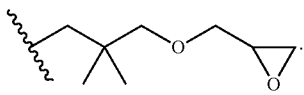 [SMILES: *CC(C)(C)COCC1CO1]

In some embodiments, the hydrocarbon solvent is an aromatic hydrocarbon solvent. In one embodiment, the aromatic hydrocarbon solvent is toluene, xylene, tetralin, a $C_9$-$C_{10}$ aromatic hydrocarbon solvent, or a $C_{10}$-$C_{12}$ aromatic hydrocarbon solvent.

In some embodiments, the phenolic resin is soluble in a hydrocarbon solvent at room temperature or above. In one embodiment, the phenolic resin is soluble in a hydrocarbon solvent at a temperature of −25° C. or above.

Another aspect of the invention relates to a resin with an increased solubility in a hydrocarbon solvent, comprising one or more modified calixarene compounds. Each calixarene compound comprises 4-20 units of formula (I'),

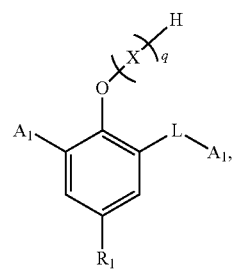

and/or formula (II),

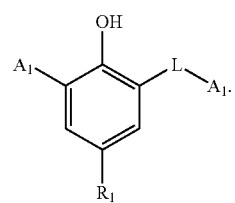

Each X is independently the same or different moiety, each moiety having a structure of

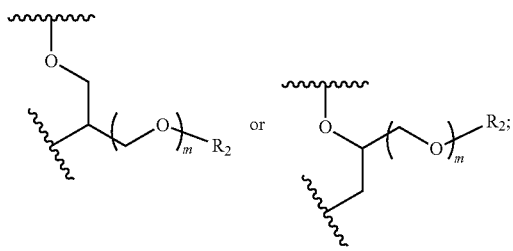

each $R_1$ is independently a H, $C_1$ to $C_{30}$ alkyl, phenyl, or arylalkyl; each $R_2$ is independently a H, $C_1$ to $C_{20}$ branched or unbranched alkyl which may optionally be substituted with one or more glycidyl ether units of the formula

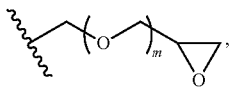

$C_2$ to $C_{10}$ alkenyl, or $C_5$ to $C_{10}$ aryl; each L is independently selected from the group consisting of —$CH_2$—, —$C(O)$—, —$CH(R_3)$—, —$(CH_2)_n$—O—$(CH_2)_n$—, —$C(R_3)_2$—, and —S—; each $R_3$ is independently a $C_1$-$C_6$ alkyl; each m is independently an integer from 0 to 10; each n is independently an integer from 1 to 2; each q is independently an integer from 1 to 100; and each $A_1$ represents a direct covalent bond to an adjacent unit of formula (I') or formula (II) such that there is one L group between adjacent units, whereby the total units in the calixarene compound form a ring. The units of formula (I') make up from about 35% to 100% of the overall units present in the calixarene compound. The solubility of the resin is increased by at least 20% compared to a resin comprising calixarene compounds containing units of formula (II) but no units of formula (I').

In one embodiment, the solubility of the resin is increased by at least 50% compared to a resin comprising calixarene compounds containing units of formula (II) but no units of formula (I').

In one embodiment, the solubility of the resin is increased by at least 100% compared to a resin comprising calixarene compounds containing units of formula (II) but no units of formula (I').

In one embodiment, the solubility of the resin is increased by at least 120% compared to a resin comprising calixarene compounds containing units of formula (II) but no units of formula (I').

Another aspect of the invention relates to a process for stabilizing or solubilizing a phenolic resin mixture, comprising:
reacting a phenolic resin mixture comprising linear phenolic resins and calixarene compounds having pendant phenolic hydroxyl groups with one or more compounds of formula (III):

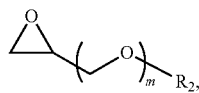

an optional catalyst, and at least one hydrocarbon solvent at an elevated temperature for a period of time sufficient to alkoxylate one or more of the phenolic hydroxyl groups of the linear phenolic resins and/or calixarene compounds in the phenolic resin mixture to result in a resin solution substantially free of undissolved solid components, wherein the solubility of the phenolic resin mixture is increased by at least 20% compared to a phenolic resin mixture that is not subjected to said reacting step,
wherein
   $R_2$ is a H, $C_1$ to $C_{20}$ branched or unbranched alkyl which may optionally be substituted with one or more glycidyl ether units of the formula

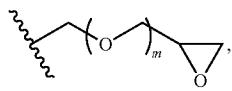

$C_2$ to $C_{10}$ alkenyl, or $C_5$ to $C_{10}$ aryl; and
   m is an integer from 0 to 10, for instance, from 0 to 3.

In one embodiment, on average, about 0.1 to about 100 moles of the compounds of formula (III) are added to react with each mole of the phenolic units of the phenolic resin.

In one embodiment, on average, about 0.1 to about 20 moles of the compounds of formula (III) are added to react with each mole of the phenolic units of the phenolic resin.

In one embodiment, on average, about 0.2 to about 3 mole of the compounds of formula (III) are added to react with each mole of the phenolic units of the phenolic resin.

In some embodiments, the catalyst is present and is selected from the group consisting of sodium hydroxide, potassium hydroxide, sodium carbonate, potassium carbonate, sodium bicarbonate, potassium bicarbonate, triethylamine, imidazole, 2-methylimidazole, pyridine, and combinations thereof. In one embodiment, the catalyst is 2-methylimidazole.

In some embodiments, the elevated temperature is in the range of 110-170° C. In one embodiment, the elevated temperature is in the range of 125-155° C. In one embodiment, the elevated temperature is in the range of 140-155° C.

In some embodiments, less than 5% of residual compound of formula (III) remains unreacted within 1 hour of the addition of the compound of formula (III). In one embodiment, less than 1% of residual compound of formula (III) remains unreacted within 1 hour of the addition of the compound of formula (III).

In some embodiments, $R_2$ is selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. In one embodiment, $R_2$ is n-butyl.

In some embodiments, $R_2$ is a $C_1$ to $C_{20}$ branched or unbranched alkyl substituted with one or more glycidyl ether units of the formula

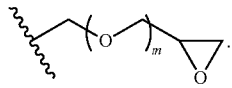

In one embodiment, $R_2$ is a $C_1$ to $C_8$ branched or unbranched alkyl substituted with one or more glycidyl ether units of the formula

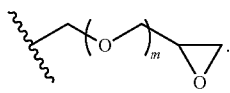

For instance, $R_2$ is

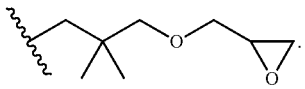 [SMILES: *CC(C)(C)COCC1CO1]

In some embodiments, the calixarene compounds comprise 4-20 units of formula (II):

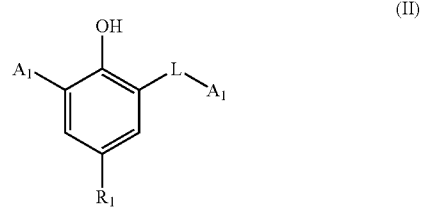

wherein
   each $R_1$ is independently a H, $C_1$ to $C_{30}$ alkyl, phenyl, or arylalkyl;
   each L is independently selected from the group consisting of —$CH_2$—, —C(O)—, —$CH(R_3)$—, —$(CH_2)_n$—O—$(CH_2)_n$—, and —$C(R_3)_2$—;
   each $R_3$ is independently a $C_1$-$C_6$ alkyl;
   each n is independently an integer from 1 to 2;
   each $A_1$ represents a direct covalent bond to an adjacent unit of formula (II) such that there is one L group between adjacent units, whereby the total units in the calixarene compound form a ring. In one embodiment, each $R_1$ is independently a $C_4$ to $C_{12}$ or $C_{24}$ to $C_{28}$ alkyl; and wherein the total number of units in the calixarene compounds is from 4 to 8.

In one embodiment, the solubility of the phenolic resin mixture is increased by at least 50% compared to a phenolic resin mixture that is not subjected to said reacting step.

In one embodiment, the solubility of the phenolic resin mixture is increased by at least 100% compared to a phenolic resin mixture that is not subjected to said reacting step.

In one embodiment, the solubility of the phenolic resin mixture is increased by at least 120% compared to a phenolic resin mixture that is not subjected to said reacting step.

In one embodiment, less than 10% of solid components precipitate out of the solvent after the storage of 24 hours or longer.

In one embodiment, less than 5% of solid components precipitate out of the solvent after the storage of 24 hours or longer.

Another aspect of the invention relates to a stabilized or solubilized phenolic resin prepared from the process of stabilizing or solubilizing a phenolic resin mixture, comprising:
   reacting a phenolic resin mixture comprising linear phenolic resins and calixarene compounds having pendant phenolic hydroxyl groups with one or more compounds of formula (III):

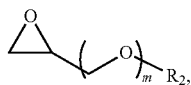

an optional catalyst, and at least one solvent at an elevated temperature for a period of time sufficient to alkoxylate one or more of the phenolic hydroxyl groups of the linear phenolic resins and/or calixarene compounds in the phenolic resin mixture to result in a resin solution substantially free of undissolved solid components, wherein the solubility of the phenolic resin mixture is increased by at least 20% compared to a phenolic resin mixture that is not subjected to said reacting step,
wherein
$R_2$ is a H, $C_1$ to $C_{20}$ branched or unbranched alkyl which may optionally be substituted with one or more glycidyl ether units of the formula

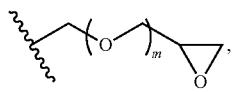

$C_2$ to $C_{10}$ alkenyl, or $C_5$ to $C_{10}$ aryl; and
m is an integer from 0 to 10, for instance, from 0 to 3.

In some embodiments, at least 35% of the phenolic hydroxyl groups in the resin have been alkoxylated with the compound of formula (III). In one embodiment, at least 50% of the phenolic hydroxyl groups in the resin have been alkoxylated with the compound of formula (III).

Another aspect of the present invention relates to a demulsifier composition comprising the resins or resin solutions described in the above aspects or embodiments.

Another aspect of the present invention relates to a demulsifier composition comprising the stabilized or solubilized phenolic resins prepared from the processes described in the above aspects or embodiments.

In one embodiment, the demulsifier composition is further able to sequester salt from crude oil and/or reduce salt levels in crude oil.

Another aspect of the present invention relates to a method of resolving a water-in-oil or oil-in-water emulsion, comprising adding to a water-in-oil or oil-in-water emulsion an effective demulsifying amount of the resin solution described in the above aspects or embodiments.

In one embodiment, the water-in-oil or oil-in-water emulsion is a crude oil emulsion, a refinery desalting emulsion, or a crude oil production emulsion.

DETAILED DESCRIPTION OF THE INVENTION

This invention relates to a resin comprising one or more modified calixarene compounds with improved solubility in a hydrocarbon solvent at both room temperature and cold temperatures, e.g., at −25° C. The solubility of the resulting phenolic resin is dramatically improved, resulting in a stable, easy to handle calixarene/linear phenolic resin mixture for utilization as a demulsifier to separate oil and water emulsion in applications such as oilfield, petroleum, and fuel applications.

One aspect of the invention relates to a resin comprising one or more modified calixarene compounds, each calixarene compound comprising 4-20 units of formula (I) and/or formula (II):

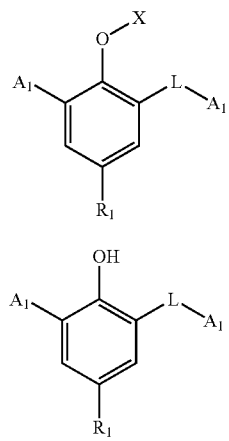

wherein each X is independently

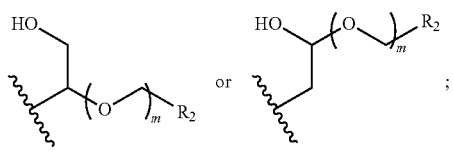

each $R_1$ is independently a H, $C_1$ to $C_{30}$ alkyl, phenyl, or arylalkyl; each $R_2$ is independently a H, $C_1$ to $C_{20}$ branched or unbranched alkyl which may optionally be substituted with one or more glycidyl ether units of the formula

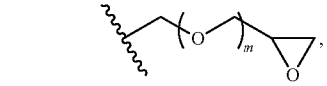

$C_2$ to $C_{10}$ alkenyl, or $C_5$ to $C_{10}$ aryl; each L is independently selected from the group consisting of —$CH_2$—, —C(O)—, —CH($R_3$)—, —$(CH_2)_n$—O—$(CH_2)_n$—, —C($R_3$)$_2$—, and —S—; each $R_3$ is independently a $C_1$-$C_6$ alkyl; each m is independently an integer from 0 to 10, for instance, from 0 to 3; each n is independently an integer from 1 to 2; each $A_1$ represents a direct covalent bond to an adjacent unit of formula (I) or formula (II) such that there is one L group between adjacent units, whereby the total units in the calixarene compound form a ring; and wherein units of formula (I) make up from about 35% to 100% of the overall units present in the calixarene compound.

The term "stable" is used herein as a measure of solubility, i.e., whether the phenolic resins containing the linear/cyclic phenolic resin mixture are soluble enough so that when the phenolic resin containing such a mixture is prepared, significant amounts of insolubles will not precipitate out of the resin solution, and the resulting resin would be suitable for storage and/or can be more easily handled or transported at room temperature without precipitation.

The phenolic resins of the invention include a mixture of linear phenolic resins and cyclic phenolic resins, such as calixarenes.

The linear phenolic resins may contain a substituent on the benzene ring, at either the ortho or para position to the hydroxyl of linear phenolic resins. Typically, the linear phenolic resin has a structure of Formula (A):

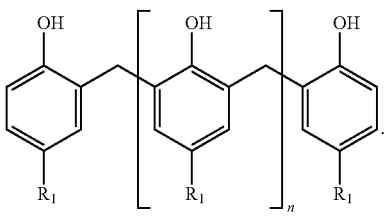
(A)

The substituent group on the benzene ring of the linear phenolic resin ($R_1$ in Formula (A)) may be independently H, $C_1$ to $C_{30}$ alkyl, phenyl, or arylalkyl. For instance, the substituent group ($R_1$ in Formula (A)) may be independently $C_4$ to $C_{18}$ alkyl, $C_4$ to $C_{12}$ alkyl, or $C_1$ to $C_7$ alkyl. In one embodiment, at least one substituent group ($R_1$ in Formula (A)) on the benzene ring of the linear phenolic resin is $C_1$ to $C_5$ alkyl, such as $C_4$ or $C_5$ alkyl. The number of repeating units of the linear phenolic resin (n in Formula (A)) may be 2 to 20, for instance, 2 to 10, 2 to 8, 2 to 6, or 2 to 4, resulting in a molecular weight typically ranging from about 500 to about 10,000 Daltons, for instance, from about 500 to about 5,000 Daltons, or from about 500 to about 3,000 Daltons.

The phenolic resins contain calixarenes ranging from about 35% to about 100%, for instance, from about 40% to about 90%, from about 50% to about 90%, from about 50% to about 80%, or from about 55% to about 75%.

The term "calixarene" generally refers to a variety of derivatives that may have one or more substituent groups on the hydrocarbons of cyclo{oligo[(1,3-phenylene)methylene]}. The calixarenes may contain a substituent on the benzene ring of calixarenes. Typically, the calixarene has a structure of Formula (B):

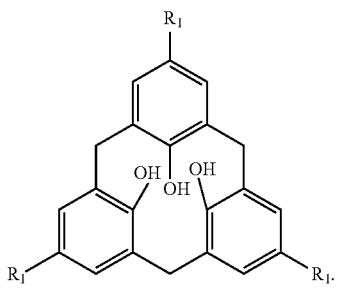
(B)

The substituent group on the benzene ring of the calixarene ($R_1$ in Formula (B)) may be independently H, $C_1$ to $C_{30}$ alkyl, phenyl, or arylalkyl. For instance, the substituent group ($R_1$ in Formula (B)) may be independently $C_4$ to $C_{18}$ alkyl, $C_4$ to $C_{12}$ alkyl, or $C_1$ to $C_7$ alkyl. In one embodiment, at least one substituent group ($R_1$ in Formula (B)) on the benzene ring of the calixarene is $C_1$ to $C_5$ alkyl, such as $C_4$ or $C_5$ alkyl. The number of repeating units of the calixarene (n in Formula (II)) may be 2 to 20, for instance, 2 to 10, 2 to 8, 2 to 6, or 2 to 4, resulting in a molecular weight typically ranging from about 500 to about 10,000 Daltons, for instance, from about 500 to about 5,000 Daltons, or from about 500 to about 3,000 Daltons. An exemplary calixarene structure is shown as below, wherein n is 2.

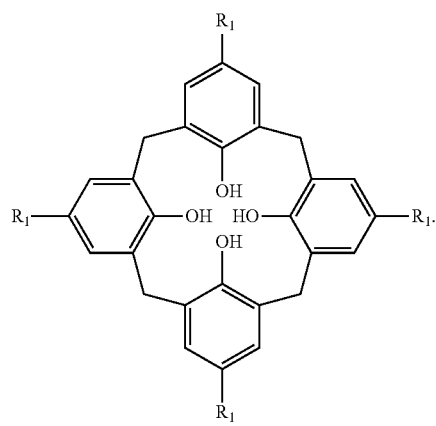

The calixarene compounds of the invention comprise 4-20 units of formula (I) and/or formula (II):

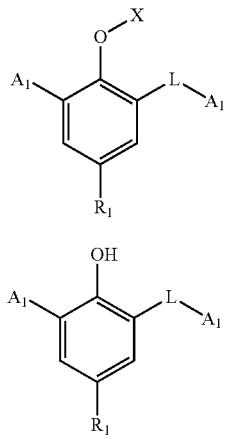
(I)

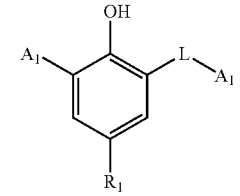
(II)

wherein each $A_1$ represents a direct covalent bond to an adjacent unit of formula (I) or formula (II) such that there is one L group between adjacent units, whereby the total units in the calixarene compound form a ring; and wherein units of formula (I) make up from about 35% to 100% of the overall units present in the calixarene compound. Thus, in the context of the invention, when a calixarene compound comprises 4 units of formula (I) and/or formula (II), the calixarene may range from having one unit of formula (I) and 3 units of formula (II), having the structure of

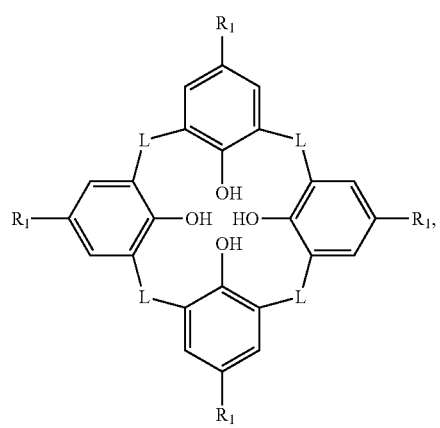

to having all four units of the calixarene as formula (I), having the structure of

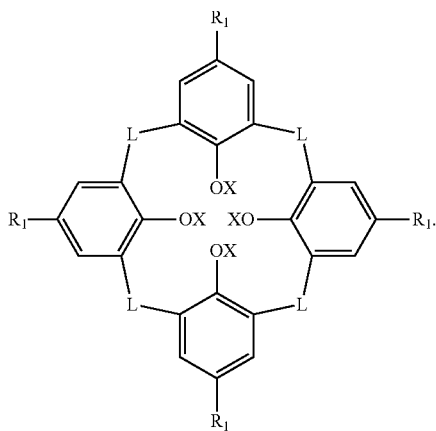

The calixarene compounds of the invention comprise 4-20 units of formula (I) and/or formula (II). For example, the calixarene compounds contain from 4-8 units, 2-6 units, 4-6 units, or 6 units.

The resins of the invention are modified to impart higher solubility in solvents. For example, the resins of the invention are modified to impart higher solubility in hydrocarbon solvents, such as aromatic hydrocarbon solvents (e.g., a $C_7$-$C_{12}$ aromatic hydrocarbon solvent or combinations thereof). Exemplary aromatic hydrocarbon solvents used in this invention include toluene, xylenes, tetralin, ShellSol® A150 ("A150," a $C_9$-$C_{10}$ aromatic hydrocarbon solvent) produced by Shell, ShellSol® A150ND ("A150ND," a $C_9$-$C_{10}$ aromatic hydrocarbon solvent with naphthalene depleted) produced by Shell and other aromatic hydrocarbon solvents known to one skilled in the art, such as Solvesso™ 150 produced by ExxonMobil Chemical (a $C_{10}$-$C_{12}$ aromatic hydrocarbon solvent).

In the context of the invention, phenolic hydroxyl groups of the resins are modified via alkoxylation with epoxide-containing compounds of formula (III):

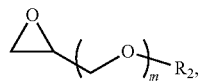

where $R_2$ is H, $C_1$ to $C_{20}$ branched or unbranched alkyl which may optionally be substituted with one or more glycidyl ether units of the formula

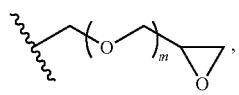

$C_2$ to $C_{10}$ alkenyl, or $C_5$ to $C_{10}$ aryl; and m is an integer from 0 to 10, for instance, from 0 to 8, from 0 to 6, or from 0 to 3, such as 1 or 2, resulting in higher stabilization to the resin. It will be appreciated by one having skill in the art that a higher degree of alkoxylation results in a higher imparted stability in the resins of the invention.

In one embodiment, phenolic hydroxyl groups of the resins are modified via alkoxylation with epoxide-containing compounds of formula (III):

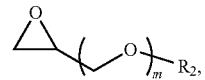

where m is 1 or 2. In an embodiment, $R_2$ is selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. For example, the phenolic hydroxyl groups of the resins are modified via alkoxylation with n-butyl glycidyl ether.

Alternatively, phenolic hydroxyl groups of the resins are modified via alkoxylation with epoxide-containing compounds of formula (III):

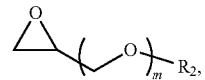

where m is 0. In an embodiment, $R_2$ is selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. For example, the phenolic hydroxyl groups of the resins are modified via alkoxylation with 2-phenyl oxirane.

In another embodiment, phenolic hydroxyl groups of the resins are modified via alkoxylation with epoxide-containing compounds of formula (III):

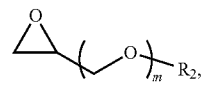

where $R_2$ is a $C_1$ to $C_{20}$ branched or unbranched alkyl which may optionally be substituted with one or more glycidyl ether units of the formula

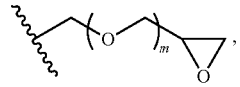

where m is an integer from 0 to 10, for instance, from 0 to 8, from 0 to 6, or from 0 to 3. For instance, the compound of formula (III) is a diglycidyl ether, triglycidyl ether, or tetraglycidyl ether, where $R_2$ is a $C_1$ to $C_{20}$ branched or unbranched alkyl, such as a $C_1$-$C_8$ branched or unbranched alkyl, or a $C_3$-$C_6$ branched alkyl, where the $R_2$ group is substituted with one, two, or three glycidyl ether units, respectively, of the formula

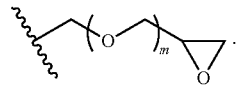

In one embodiment, the diglycidyl ether in the $R_2$ group is neopentyl glycol diglycidyl ether, where $R_2$ is

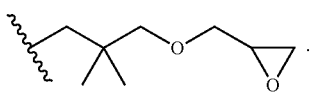 [SMILES: *CC(C)(C)COCC1CO1]

The phenolic hydroxyl groups of the resins may or may not all be alkoxylated with epoxide-containing compounds of formula (III). The resins of the invention contain calixarenes having from 35% to 100% of their phenolic hydroxyl groups having been alkoxylated and all integer ranges therebetween. For example, from about 40% to about 90%, from about 50% to about 90%, from about 50% to about 80%, or from about 55% to about 75% of the phenolic hydroxyl groups have been alkoxylated with the compound of formula (III).

In an embodiment of the invention, the calixarene compounds of the invention comprise 4-20 units of formula (I) and/or formula (II):

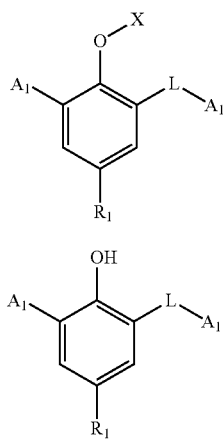

where each $R_1$ is independently a $C_4$ to $C_{12}$ alkyl group. Each $R_1$ may independently be a tert-butyl, nonyl, or tert-octyl group. The solubility improvement is particularly useful to those calixarene compounds having a lower alkyl as the $R_1$ substituent. For instance, calixarene compounds in which at least one $R_1$ group is $C_1$ to $C_5$ alkyl, such as $C_4$ or $C_5$ alkyl. Alternatively, the $R_1$ groups are higher alkyl substituents. For example, each $R_1$ may be a $C_{24}$ to $C_{28}$ alkyl group. The calixarene compound may contain units of formula (I) and/or formula (II) independently containing random combinations of various $R_1$ groups.

In an embodiment, the one or more units in the modified calixarene compounds has the structure of

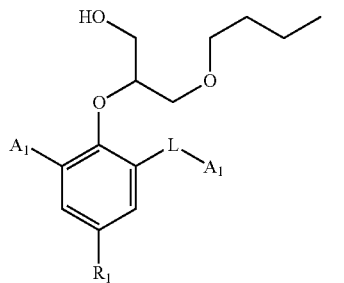

or

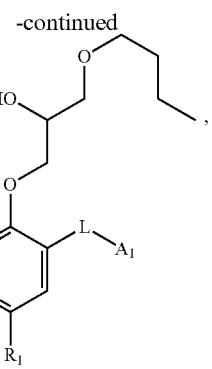

wherein: each $R_1$ is independently a $C_4$ to $C_{12}$ alkyl, and the total number of units in the calixarene compounds is from 4-8. The phenolic hydroxyl groups of the resin may react with an epoxide at the less-substituted and/or more-substituted epoxide carbon, resulting in regioisomer formation. The regioselectivity of the alkoxylation can be controlled by means apparent to one having skill in the art, for instance, by controlling solvent selection, sterics, and/or pH.

Adjacent phenol rings of the phenol resin are connected together through an L group. For example, two units of formula (I) connected together have the structure of

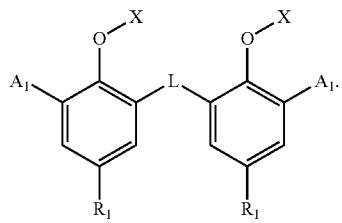

L groups are selected from the group consisting of —$CH_2$—, —C(O)—, —$CH(R_3)$—, $(CH_2)_n$—O—$(CH_2)_n$—, —$C(R_3)_2$—, and —S—; where each $R_3$ is independently a $C_1$-$C_6$ alkyl; and each n is independently an integer from 1 to 2. For example, L may be —$CH_2$— or —$CH_2$—O—$CH_2$—.

Another aspect of the invention relates to a resin solution of a phenolic resin, comprising one or more modified calixarene compounds. Each calixarene compound comprises 4-20 units of formula (I'),

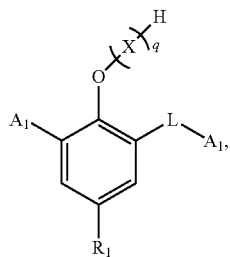

and/or formula (II),

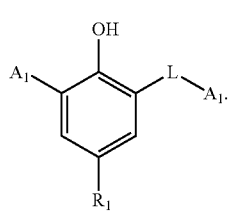

Each X is independently the same or different moiety, each moiety having a structure of

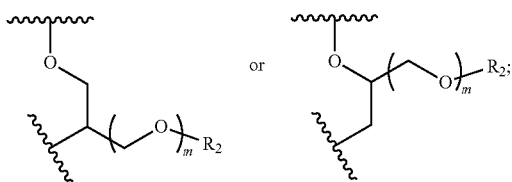

each $R_1$ is independently a H, $C_1$ to $C_{30}$ alkyl, phenyl, or arylalkyl; each $R_2$ is independently a H, $C_1$ to $C_{20}$ branched or unbranched alkyl which may optionally be substituted with one or more glycidyl ether units of the formula

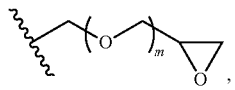

$C_2$ to $C_{10}$ alkenyl, or $C_5$ to $C_{10}$ aryl; each L is independently selected from the group consisting of —$CH_2$—, —C(O)—, —$CH(R_3)$—, —$(CH_2)_n$—O—$(CH_2)_n$—, —$C(R_3)_2$—, and —S—; each $R_3$ is independently a $C_1$-$C_6$ alkyl; each m is independently an integer from 0 to 10; each n is independently an integer from 1 to 2; each q is independently an integer from 1 to 100; and each $A_1$ represents a direct covalent bond to an adjacent unit of formula (I') or formula (II) such that there is one L group between adjacent units, whereby the total units in the calixarene compound form a ring. The phenolic resin is soluble in a hydrocarbon solvent having a concentration of about 50 wt % to about 75 wt %.

The units of formula (I') make up from about 35% to 100% of the overall units present in the calixarene compound, for instance, from about 40% to about 90%, from about 50% to about 90%, from about 50% to about 80%, or from about 55% to about 75% of the overall units present in the calixarene compound.

The modified calixarene compounds comprise 4-20 units of formula (I') and/or formula (II). For example, the modified calixarene compounds can contain from 4 to 8 units, from 2 to 6 units, from 4 to 6 units, or 6 units of formula (I') and/or formula (II).

In formulas (I'), each X is independently

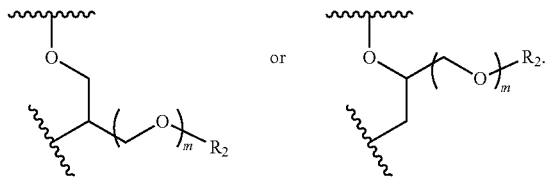

The variable X is the result from the alkoxylations of the phenolic hydroxyl groups of the calixarene compounds with epoxide-containing compounds of formula (III):

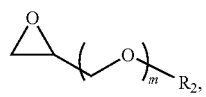

as described above. X is selected from the two regioisomers because, as described above, the phenolic hydroxyl groups may react with an epoxide at the less-substituted and/or more-substituted epoxide carbon, resulting in regioisomer formation. Depending on the degree of alkoxylation, the modified calixarene compound can contain q units of X, which can be a random combination of the two regioisomers. One skilled in the art would understand that the two ⁂ in each structure represent the connection points of the X moiety to the formula, so that the carbon atom of the X moiety is connected to the oxygen atom in the phenolic unit of formula (I') or in a different X moiety, and the oxygen atom of the X moiety is connected to the carbon atom in a different X moiety or to the hydrogen atom of formula (I'). For instance, an illustrative structure of formula (I') containing two units of X moieties can have a structure of

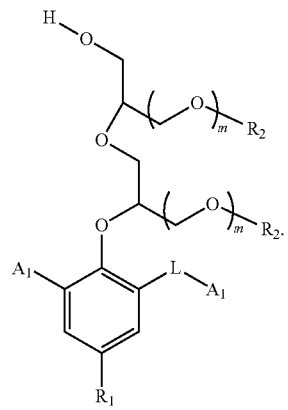

Each q is independently an integer from 1 to 100. The variable q represents the degree of alkoxylation by the compound of formula (III). For instance, each q in each unit of the formula (I') can be independently an integer from 1 to 50, from 1 to 20, from 1 to 10, from 1 to 5, from 1 to 3, from 1 to 2, or 1. In one embodiment, q is 1 in one or more units in the modified calixarene compounds.

The alkoxylations of the phenolic hydroxyl groups of the calixarene compounds by reacting, on average, 1 mole of the compounds of formula (III) for each mole of the phenolic units of the phenolic resin may produce a calixarene compound in which q is 1 on each phenolic unit. It is possible, however, such alkoxylation may also produce a calixarene compound in which q is 2 or more on one or more phenolic units whereas the phenolic hydroxyl groups on other phenolic units of the calixarene compound are left unmodified, as in Formula (II), in which q would effectively be zero. It is also possible that such alkoxylation may produce certain calixarene compounds in which the q values vary on one or more of their phenolic units, and certain calixarene compounds that are completely unmodified, i.e., q is zero in each of their phenolic units.

In formulas (I') and (II), each $R_1$ is independently a H, $C_1$ to $C_{30}$ alkyl, phenyl, or arylalkyl. Exemplary $R_1$ groups are $C_4$ to $C_{12}$ alkyls. For instance, each $R_1$ is independently tert-butyl, tert-octyl, nonyl, or combinations thereof. In one embodiment, at least one $R_1$ group is $C_1$ to $C_5$ alkyl, such as $C_4$ or $C_5$ alkyl. Other exemplary $R_1$ groups are higher alkyl substituents, such as a $C_{24}$ to $C_{28}$ alkyl group. The calixarene compound may contain units of formula (I') and/or formula (II) independently containing random combinations of various $R_1$ groups.

In the phenolic resins, one or more phenolic hydroxyl groups of the resins are modified via alkoxylation with epoxide-containing compounds of formula (III):

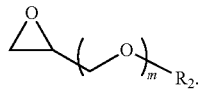

As discussed above, each m is independently an integer from 0 to 10, for instance, from 0 to 8, from 0 to 6, or from 0 to 3. Each $R_2$ is independently a H, $C_1$ to $C_{20}$ branched or unbranched alkyl which may optionally be substituted with one or more glycidyl ether units of the formula

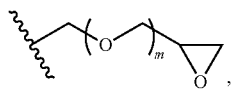

$C_2$ to $C_{10}$ alkenyl, or $C_5$ to $C_{10}$ aryl.

In certain embodiments, each m is independently 1 or 2. For instance, each m is 1. In certain embodiments, each $R_2$ is independently selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. For instance, $R_2$ may be butyl, such as n-butyl. In this case, each X would independently have a structure of

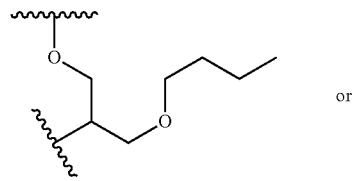

or

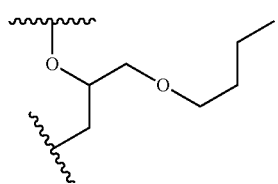

Alternatively, each $R_2$ may be independently a $C_1$ to $C_{20}$ branched or unbranched alkyl which may optionally be substituted with one or more glycidyl ether units of the formula

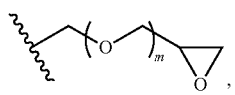

in which m is as defined above. For instance, each $R_2$ can be independently a $C_1$ to $C_8$ branched or unbranched alkyl, substituted with one or more glycidyl ether units of the formula

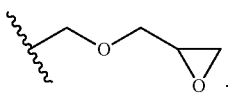

Exemplary $R_2$ is

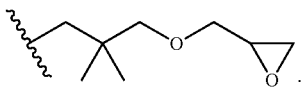

In this case, each X would independently have a structure of

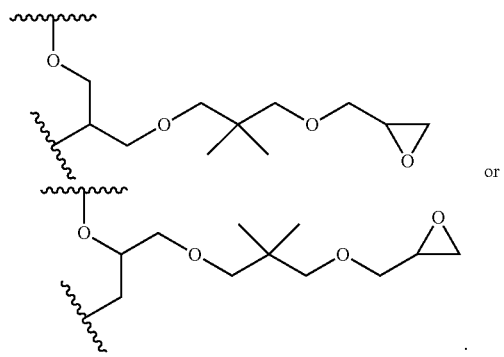

or

In certain embodiments, each m is 0. In one embodiment, each $R_2$ is independently selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl. Exemplary $R_2$ is phenyl. In this case, each X would independently have a structure of

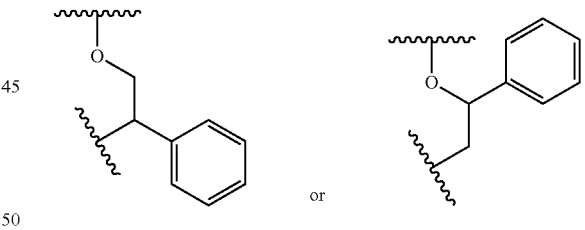

In the calixarene compounds, whether modified or unmodified, adjacent phenol rings of the phenol resin are connected together through an L group. Each $A_1$ represents a direct covalent bond to an adjacent unit of formula (I') or formula (II) such that there is one L group between adjacent units, whereby the total units in the calixarene compound form a ring. Each L group is selected from the group consisting of —$CH_2$—, —C(O)—, —CH($R_3$)—, —($CH_2$)$_n$—O—($CH_2$)$_n$—, —C($R_3$)$_2$—, and —S—, in which each $R_3$ is independently a $C_1$-$C_6$ alkyl and each n is independently an integer from 1 to 2. For example, L may be —$CH_2$— or —$CH_2$—O—$CH_2$—.

In some embodiments, one or more modified calixarene compounds have one or more units of formula (I') represented by the structure of

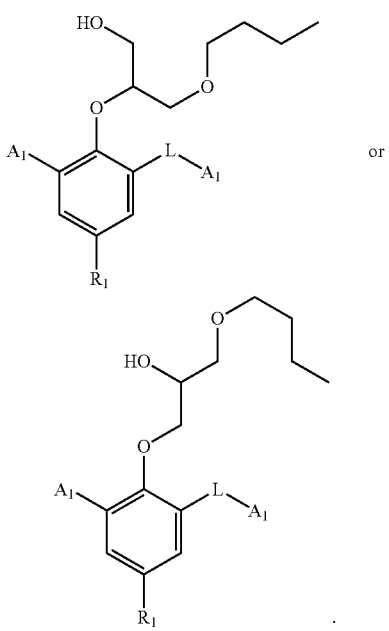

or of 24 hours or longer, less than 20%, less than 10%, or less than 5% of solid components precipitate out of the solvent from the resin solution.

Accordingly, another aspect of the invention relates to a resin with an increased solubility in a hydrocarbon solvent, comprising one or more modified calixarene compounds. Each calixarene compound comprises 4-20 units of formula (I'),

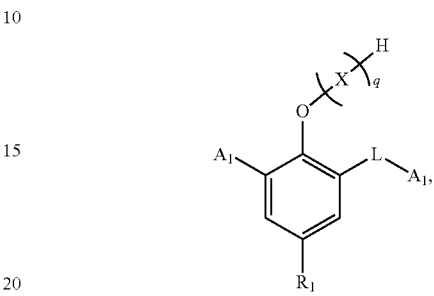

and/or formula (II),

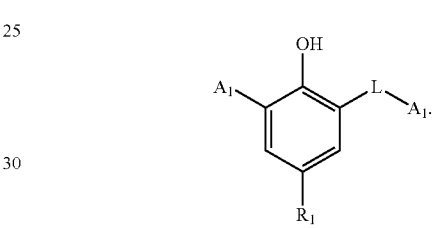

Each $R_1$ is independently a $C_4$ to $C_{12}$ alkyl; each L is independently selected from the group consisting of —$CH_2$—, —C(O)—, —CH($R_3$)—, —($CH_2$)$_n$—O—($CH_2$)$_n$—, and —C($R_3$)$_2$—; each $R_3$ is independently a $C_1$-$C_6$ alkyl; each n is independently an integer from 1 to 2; and the total number of units in the calixarene compounds is from 4 to 8. In one embodiment, each $R_1$ is independently tert-butyl, tert-octyl, nonyl, or combinations thereof. In one embodiment, at least one $R_1$ group is $C_1$ to $C_5$ alkyl, such as $C_4$ or $C_5$ alkyl. In one embodiment, each L is independently —$CH_2$— or —$CH_2$—O—$CH_2$—. In one embodiment, the units of formula (I') having the above structure make up from about 50% to about 90% of the overall units present in the calixarene compound. For example, the units of formula (I') having the above structure make up from about 50% to about 80%, or from about 55% to about 75% of the overall units present in the calixarene compound.

After the alkoxylation with the compounds of formula (III), the resulting phenolic resins become soluble in a hydrocarbon solvent, such as an aromatic hydrocarbon solvent, resulting a highly concentrated resin solution that can have the concentration of the linear/cyclic phenolic resin to about 50 wt % to about 75 wt %. As discussed above, exemplary aromatic hydrocarbon solvents are toluene, xylene, tetralin, a $C_9$-$C_{10}$ aromatic hydrocarbon solvent (such as ShellSol® A150 or ShellSol® A150ND), or a $C_{10}$-$C_{12}$ aromatic hydrocarbon solvent (such as Solvesso™ 150).

The term "resin solution" means that the linear/cyclic phenolic resin mixture is soluble in a hydrocarbon solvent, as discussed above, capable of forming a resin solution that is substantially free of undissolved solid components, under a wide range of temperatures. Also, the linear/cyclic phenolic resin mixture is soluble enough that the resulting resin solution can be handled, transported, or stored for a long period of time under a wide range of temperatures without precipitation. For instance, the resin is soluble in a hydrocarbon solvent at room temperature or above, at 10° C. or above, at 0° C. or above, at −10° C. or above, at −20° C. or above, or at −25° C. or above. For instance, after the storage Each X is independently the same or different moiety, each moiety having a structure of

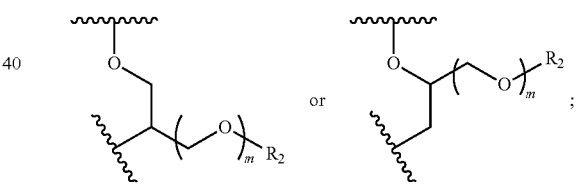

each $R_1$ is independently a H, $C_1$ to $C_{30}$ alkyl, phenyl, or arylalkyl; each $R_2$ is independently a H, $C_1$ to $C_{20}$ branched or unbranched alkyl which may optionally be substituted with one or more glycidyl ether units of the formula

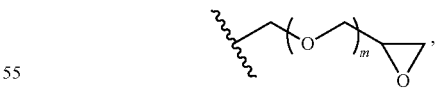

$C_2$ to $C_{10}$ alkenyl, or $C_5$ to $C_{10}$ aryl; each L is independently selected from the group consisting of —$CH_2$—, —C(O)—, —CH($R_3$)—, —($CH_2$)$_n$—O—($CH_2$)$_n$—, —C($R_3$)$_2$—, and —S—; each $R_3$ is independently a $C_1$-$C_6$ alkyl; each m is independently an integer from 0 to 10; each n is independently an integer from 1 to 2; each q is independently an integer from 1 to 100; and each $A_1$ represents a direct covalent bond to an adjacent unit of formula (I) or formula (II) such that there is one L group between adjacent units, whereby the total units in the calixarene compound form a ring. The units of formula (I') make up from about 35% to 100% of the overall units present in the calixarene compound.

The solubility of the resin is increased by at least 20%, for instance, at least 40%, at least 50%, at least 60%, at least 80%, at least 100%, or at least 120%, compared to a resin comprising calixarene compounds containing units of formula (II) but no units of formula (I').

This invention also relates to a process for stabilizing or solubilizing a phenolic resin containing a mixture of linear phenolic resins and cyclic phenolic resins (e.g., calixarene) to improve the solubility of the phenolic resin in a hydrocarbon solvent. The phenolic resin containing calixarenes is modified with an epoxide of formula (III), generating a partially alkoxylated derivative that is soluble in a hydrocarbon solvent at both room temperature and cold temperatures, e.g., at −25° C. Accordingly, the solubility of the resulting phenolic resin is dramatically improved, resulting in a stable, easy to handle calixarene/linear phenolic resin mixture intermediate for utilization as a demulsifier to separate oil and water emulsion in applications such as oilfield, petroleum, and fuel applications.

An aspect of the invention relates to a process for stabilizing or solubilizing a phenolic resin mixture, comprising: reacting a phenolic resin mixture comprising linear phenolic resins and calixarene compounds having pendant phenolic hydroxyl groups with one or more compounds of formula (III):

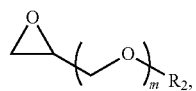

an optional catalyst, and at least one hydrocarbon solvent at an elevated temperature for a period of time sufficient to alkoxylate one or more of the phenolic hydroxyl groups of the linear phenolic resins and/or calixarene compounds in the phenolic resin mixture to result in a resin solution substantially free of undissolved solid components, wherein the solubility of the phenolic resin mixture is increased by at least 20% compared to a phenolic resin mixture that is not subjected to said reacting step, wherein $R_2$ is a H, $C_1$ to $C_{20}$ branched or unbranched alkyl which may optionally be substituted with one or more glycidyl ether units of the formula

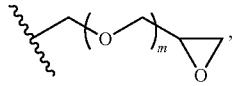

$C_2$ to $C_{10}$ alkenyl, or $C_5$ to $C_{10}$ aryl; and m is an integer from 0 to 10, for instance, from 0 to 8, from 0 to 6, or from 0 to 3. On average, about 0.1 to about 100 moles, about 0.1 to about 20 moles, about 0.2 to about 3 moles, or about 0.2 to 1 mole of the compounds of formula (III) may react with the phenolic hydroxyl groups of the calixarene compounds for each mole of the phenolic units of the phenolic resin.

This process forms a stabilized phenolic resin with an increased solubility in a hydrocarbon solvent as compared to an unmodified phenolic resin that has not been subjected to such process.

The catalyst in the process is optional and may be used to accommodate faster reaction times and/or lower reaction temperatures. In an embodiment, the catalyst is present in the process and is a base catalyst. Typical base catalysts used are selected from the group consisting of sodium hydroxide, potassium hydroxide, sodium carbonate, potassium carbonate, sodium bicarbonate, potassium bicarbonate, triethylamine, imidazole, 2-methylimidazole, pyridine, and combinations thereof. For instance, the catalyst may be 2-methylimidazole. The amount of catalyst, if present, may range from about 0.01 wt % to about 5 wt %. For example, the amount of catalyst, if present, may range from about 0.02 wt % to about 5 wt %, or from about 0.5 wt % to about 3 wt %, or from about 0.1 wt % to about 1 wt %, or from about 0.1 wt % to about 0.5 wt %, or from about 0.2 wt % to about 0.3 wt %.

The process for stabilizing a phenolic resin mixture is carried out at an elevated temperature, for instance, temperatures in the range of 110-170° C., such as 125-160° C., 125-155° C., 140-155° C., or 145-155° C.

In an embodiment, less than 5% of residual compound of formula (III) remains unreacted within 1 hour of the start of the reaction (i.e., when the compound of formula (III) is added to the reaction system), for instance, less than 3%, or less than 1% of residual compound of formula (III) can remain unreacted within 1 hour of the start of the reaction.

As noted above, $R_2$ in formula (III):

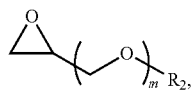

can be H, $C_1$ to $C_{20}$ branched or unbranched alkyl which may optionally be substituted with one or more glycidyl ether units of the formula

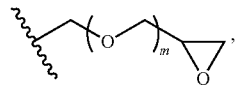

$C_2$ to $C_{10}$ alkenyl, or $C_5$ to $C_{10}$ aryl. Alternatively, $R_2$ can be hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl, and m=1. For example, $R_2$ can be n-butyl glycidyl ether.

The unmodified calixarene compounds of the invention comprise 4-20 units of formula (II):

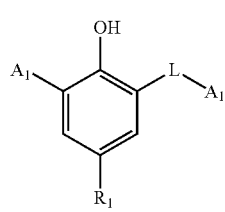

wherein each $R_1$ is independently a H, $C_1$ to $C_{30}$ alkyl, phenyl, or arylalkyl; each L is independently selected from the group consisting of —$CH_2$—, —C(O)—, —$CH(R_3)$—, —$(CH_2)_n$—O—$(CH_2)_n$—, —$C(R_3)_2$—, and —S—; each $R_3$ is independently a $C_1$-$C_6$ alkyl; each n is independently an integer from 1 to 2; each $A_1$ represents a direct covalent bond to an adjacent unit of formula (II) such that there is one L group between adjacent units, whereby the total units in the calixarene compound form a ring.

In one embodiment, each $R_1$ is independently a $C_4$ to $C_{12}$ or $C_{24}$ to $C_{28}$ alkyl; and wherein the total number of units in the calixarene compounds is from 4-8. In one embodiment, at least one $R_1$ group is $C_1$ to $C_5$ alkyl, such as $C_4$ or $C_5$ alkyl.

The stabilized or solubilized phenolic resin prepared from the processes described herein contain calixarenes having from 35% to 100% of their phenolic hydroxyl groups having been alkoxylated and all integer ranges therebetween. In one example, at least at least 35% of the phenolic hydroxyl groups in the resin have been alkoxylated with the compound of formula (III). In another example, at least 40% of the phenolic hydroxyl groups in the resin have been alkoxylated with the compound of formula (III). In another example, at least 50% of the phenolic hydroxyl groups in the resin have been alkoxylated with the compound of formula (III). In another example, at least 75% of the phenolic hydroxyl groups in the resin have been alkoxylated with the compound of formula (III). In another example, at least 90% of the phenolic hydroxyl groups in the resin have been alkoxylated with the compound of formula (III). In another example, at least 95% of the phenolic hydroxyl groups in the resin have been alkoxylated with the compound of formula (III).

The typical reaction process involves heating and mixing the calixarene containing resin slurry in aromatic hydrocarbon solvent, optionally, adding catalyst (e.g., 2-methylimidizole), at 30-50° C. The epoxide of formula (III) (e.g., a glycidyl ether) is then added and the mixture is heated to 125-155° C. The slurry appearance typically becomes noticeably darker as the reaction product becomes soluble in the aromatic solvent. In most cases this begins at 130° C. The mixture typically becomes completely soluble in the aromatic solvent at 125-155° C. after mixing for 10-30 minutes and the resulting solution is clear. Once clear the mixture is held at temperature for one to two hours to complete the reaction. The solution is cooled and analyzed for residual epoxide to determine completeness of the reaction. Typically, less than 1% residual epoxide remains under this procedure.

Using glycidyl ethers (i.e., m=1) to stabilize the calixarene-containing resins confers numerous advantages over other known methods in the art for stabilizing calixarene-containing phenolic resins (e.g., alkoxylation with alkylene carbonates). For example, the temperature required in the stabilization reaction procedure is much lower than similar techniques. Using a glycidyl ether to alkoxylate a phenolic resin typically allows for a temperature of 30-50° C. less than alkylene carbonates (e.g., 140° C. for glycidyl ethers compared to 170-180° C. for alkylene carbonates). Additionally, using glycidyl ethers leads to much shorter processing times for solubilizing calixarenes. Procedures using other stabilization techniques call for a reaction time of 3 hours or greater compared to the process disclosed in this invention, which can typically be completed in 2 hours or less. This procedure is also attractive because there are no byproducts normally associated with the stabilization of phenolic resins. For example, no carbon dioxide is evolved using glycidyl ethers. Resins stabilized with epoxides of formula (III), such as glycidyl ethers, are also observed to solubilize linear para-tert-butylphenol chains.

The phenolic resins, e.g., phenolic novolac resins, can be prepared in any suitable manner known in the art for preparation of phenolic resins. Typically, one or more phenolic compounds are reacted with an aldehyde to form a phenolic resin. An additional aldehyde may be added later to adjust the desirable melt point of the phenolic resin. Examples of such processes can be found in U.S. Pat. No. 7,425,602, which is hereby incorporated by reference.

The reaction of the phenolic compound and the aldehyde is conducted in the presence of a base catalyst. Such base-catalyzed reaction results in phenolic resins containing a mixture of linear phenolic resins and calixarenes.

Alternatively, the reaction of the phenolic compound and the aldehyde can also be carried out under high-dilution conditions. For instance, the reaction of the phenolic compound and the aldehyde may be conducted in the presence of a large amount of a solvent, e.g., with the solvent concentration of about 80 wt %.

Suitable phenolic compounds for preparing the phenolic resins include phenol and its derivatives, which may contain one or more substituents on the benzene ring of the phenolic compound, at either the ortho or para position to the hydroxyl of the phenolic compound. If the substituent group is at the para position to the hydroxyl group of the phenolic compound, the resulting alkylene bridge (e.g., methylene bridge if formaldehyde is used) extends in the ortho positions to the hydroxyl group of the phenolic compound. If the substituent group is at the ortho position to the hydroxyl group of the phenolic compound, the resulting alkylene bridge can extend in the para position to the hydroxyl group of the phenolic compound and the other substituted ortho position to the hydroxyl group of the phenolic compound.

The substituent on the benzene ring of the phenolic compound may be $C_1$-$C_{30}$ alkyl, phenyl, or arylalkyl. Typically, the phenolic compound contains one $C_1$ to $C_{18}$ alkyl substituent at the para position. Exemplary phenolic compounds are phenol and alkylphenols including para-methylphenol, para-tert-butylphenol (PTBP), para-sec-butylphenol, para-tert-hexylphenol, para-cyclohexylphenol, para-tert-octylphenol (PTOP), para-isooctylphenol, para-decylphenol, para-dodecylphenol, para-tetradecyl phenol, para-octadecylphenol, para-nonylphenol, para-pentadecylphenol, and para-cetylphenol.

The phenolic resins may be prepared from one or more phenolic compounds reacting with an aldehyde forming an oligomer of repeating units of phenolic monomers. The resulting linear phenolic resin may be a homopolymer of phenolic monomer, or a copolymer containing different units of phenolic monomers, e.g., when two or more different phenolic compounds were reacted with an aldehyde. Similarly, the resulting calixarenes may be a homopolymer of phenolic monomer or a copolymer containing different units of phenolic monomers.

Any aldehyde known in the art for preparing a phenolic resin is suitable in this process. Exemplary aldehydes include formaldehyde, methylformcel, butylformcel, acetaldehyde, propionaldehyde, butyraldehyde, crotonaldehyde, valeraldehyde, caproaldehyde, heptaldehyde, benzaldehyde, as well as compounds that decompose to aldehyde such as paraformaldehyde, trioxane, furfural, hexamethylenetriamine, aldol, β-hydroxybutyraldelhyde, and acetals, and mixtures thereof. A typical aldehyde used is formaldehyde.

To prepare a phenolic resin, the molar ratio of the total amount of an aldehyde to phenolic compounds is in the range from 0.5:1 to 1:1, for instance, from 0.8:1 to 1:1, or from 0.9:1 to 1:1.

The phenolic resins prepared from the above process contain a mixture of linear phenolic resins and cyclic phenolic resins, such as calixarenes. The solubility of calixarenes in these resins is typically poor and, thus, undissolved solids often precipitate out of the resin solution once the phenolic resins are prepared. Typically, about 20 wt % to 40 wt % of the phenolic resins precipitate out of the resin solution almost immediately after the resins are produced, causing the instability of the resins for subsequent utilization. Once these insolubles precipitate out, it is difficult to dissolve the solids in the resin solution, thus reducing the amount of active ingredients (i.e., linear phenolic resins and cyclic phenolic resins) in the resin solution for further utilization and making the handling and transportation of the resin product difficult.

In an aspect of this invention, the phenolic resins are contacted with an epoxide-containing compound of formula (III), an optional catalyst, and at least one hydrocarbon solvent at an elevated temperature for a period of time sufficient to alkoxylate one or more of the phenolic hydroxyl groups of the linear phenolic resins and/or calixarene compounds in the phenolic resin mixture. The phenolic hydroxyl groups of the linear phenolic resins can also be at least partially alkoxylated. By this process, a stabilized phenolic resin is formed with an increased solubility and reduced Tg (glass transition temperature) of the resins, which can provide various benefits. For example, when the molecular weight of the phenolic resin is increased, e.g., to the range of 6000 to 10000 Dalton, the molten viscosity of the resin is high and the resin can become difficult to process. More solvent can be added to reduce the viscosity of the resin, as has been done in conventional processes, but this creates other issues.

The alkoxylation (or etherification) of the phenolic hydroxyl groups of the linear phenolic resin by an epoxide-containing compound of formula (III) (e.g., n-butyl glycidyl ether) is illustrated in the following exemplary scheme, Scheme 1. The alkoxylation (or etherification) of the phenolic hydroxyl groups of the calixarene phenolic resin by an epoxide of formula (III) (e.g., n-butyl glycidyl ether) is illustrated in the following exemplary scheme, Scheme 2. Schemes 1 and 2 are for illustrative purposes only, and as such they only reflect the formation of one regioisomer (i.e., alkoxylation at the less substituted epoxide-carbon). In practice, the resins may remain unalkoxylated, partially alkoxylated, or fully alkoxylated, with one or both regioisomers forming.

Scheme 1

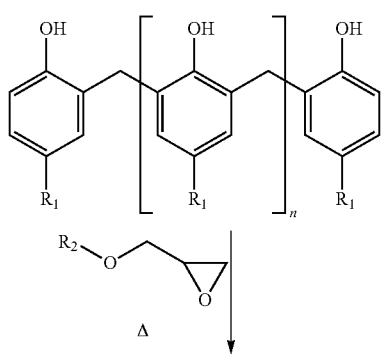

-continued

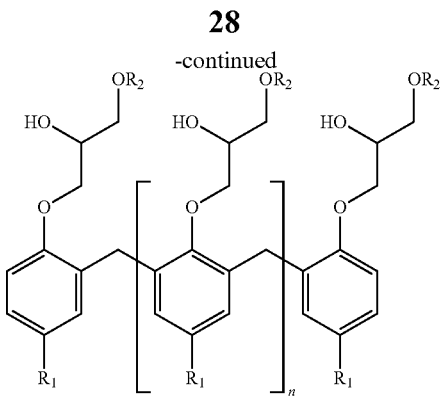

Scheme 2

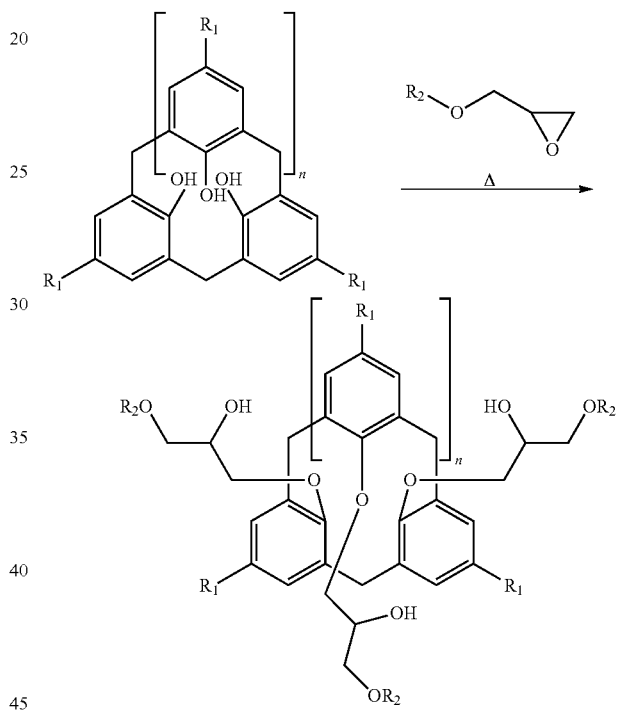

In the above schemes, $R_1$ may be H, $C_1$ to $C_{30}$ alkyl, phenyl, or arylalkyl. Each n is independently 2 to 18. Each $R_2$ is a H, $C_1$ to $C_{20}$ branched or unbranched alkyl which may optionally be substituted with one or more glycidyl ether units of the formula

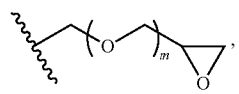

$C_2$ to $C_{10}$ alkenyl, or $C_5$ to $C_{10}$ aryl, where m is an integer from 0 to 10, for instance, from 0 to 8, from 0 to 6, or from 0 to 3.

The modified calixarene compounds described above can exist in one or more stereoisomeric form, depending on the reaction conditions for the alkoxylations of the calixarenes. For example, in Scheme 2 above, the hydrophilic alkoxylated group may extend all on one side of the calixarene plane (the calixarene plane being the macrocyclic ring formed by the calixarene phenolic units); or, alternatively, they may extend on both sides of the calixarene plane. Different stereoisomeric forms can result in modified calixarene compounds with different HLB values and different performances at the oil-water interface.

The amount of epoxide-containing compound of formula (III) added to react with the phenolic resins is in a molar ratio of the epoxide-containing compound of formula (III) to the phenolic hydroxyl units of the phenolic resins ranging from 0.1:1 to 100:1, for instance, from 0.1:1 to 20:1, from 0.2:1 to 3:1, or from 0.2:1 to 2:1. For example, the molar ratio of epoxide-containing compound of formula (III) to phenolic hydroxyl units of the phenolic resins can be greater than 0.2:1, for instance, from 0.25:1 to 1:1, 0.9:1 to 1.2:1, or about 1:1. When greater than 0.25 moles of an epoxide-containing compound of formula (III) is added to 1 mole of the phenolic resins mixture, a complete dissolution of the calixarenes is achieved, resulting in a clear or mostly clear resin solution containing 40-60% resins be weight in an aromatic solvent.

Advantageously, the process of the invention reduces the molten viscosity of the resin without adding additional solvent. The resulting products thus contain a higher percentage of active materials (i.e., linear phenolic resins and cyclic phenolic resins) in the resin solution and a lower percentage of solvent in the resin solution. Accordingly, the process can reduce cost (including the cost in production and in transportation logistics), and improve processing (less solvent is used, yet with improved solubility and molten viscosity).

After the reaction of the phenolic resins with an epoxide of formula (III), the solubility of the linear phenolic resin/calixarene in a hydrocarbon solvent can be significantly increased, compared to the solubility of the linear phenolic resin/calixarene in the hydrocarbon solvent without subjecting the resin mixture to such process, for instance, by at least 20%, at least 40%, at least 50%, at least 60%, at least 80%, at least 100%, or at least 120%. The hydrocarbon solvent is typically contained in the resulting stabilized phenolic resin because the phenolic resin is typically prepared in the presence of a hydrocarbon solvent, as discussed in the embodiments above.

Accordingly, the reaction of the phenolic resins with an epoxide of formula (III), less than 30% of the calixarenes precipitate out of the solvent after the storage of 24 hours or longer. For instance, less than 20%, less than 10%, or less than 5% of the calixarenes precipitate out of the solvent after the storage of 24 hours or longer. When an appropriate amount of epoxide is reacted with the phenolic resin, the resulting stabilized phenolic resin can be a resin solution substantially free of undissolved solid components, without adding additional solvents to the reaction system, at a temperature of −25° C. or above, for instance at −20° C. or above, at −10° C. or above, at 0° C. or above, at 10° C. or above, or at 20° C. or above.

Another aspect of the invention relates to a stabilized or solubilized phenolic resin prepared from the process described above. A stabilized or solubilized phenolic resin can be prepared by reacting a phenolic resin mixture comprising linear phenolic resins and calixarene compounds having pendant phenolic hydroxyl groups with one or more compounds of formula (III):

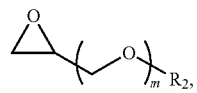

an optional catalyst, and at least one hydrocarbon solvent at an elevated temperature for a period of time sufficient to alkoxylate one or more of the phenolic hydroxyl groups of the linear phenolic resins and/or calixarene compounds in the phenolic resin mixture to result in a resin solution substantially free of undissolved solid components, wherein the solubility of the phenolic resin mixture is increased by at least 20% compared to a phenolic resin mixture that is not subjected to said reacting step, wherein $R_2$ is a H, $C_1$ to $C_{20}$ branched or unbranched alkyl which may optionally be substituted with one or more glycidyl ether units of the formula

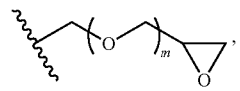

$C_2$ to $C_{10}$ alkenyl, or $C_5$ to $C_{10}$ aryl; and m is an integer from 0 to 10, for instance, from 0 to 8, from 0 to 6, or from 0 to 3.

On average, about 0.1 to about 100 moles, about 0.1 to about 20 moles, about 0.2 to about 3 moles, or about 0.2 to about 1 mole of the compound of formula (III) may react with the phenolic hydroxyl groups of the calixarene compounds for each mole of the phenolic units of the phenolic resin.

In the stabilized or solubilized phenolic resins prepared by the process described above, at least 35% of the phenolic hydroxyl groups in the resin have been alkoxylated. For example, at least 40% of the phenolic hydroxyl groups in the resin have been alkoxylated. For example, at least 50% of the phenolic hydroxyl groups in the resin have been alkoxylated. For example, at least 75% of the phenolic hydroxyl groups in the resin have been alkoxylated. For example, at least 90% of the phenolic hydroxyl groups in the resin have been alkoxylated. For example, at least 95% of the phenolic hydroxyl groups in the resin have been alkoxylated.

Applications

The compounds disclosed herein can be used in a wide range of applications. For instance, one aspect of the invention relates to a demulsifier composition comprising the resins or comprising the stabilized phenolic resin mixture prepared by the process discussed above. The resulting stabilized phenolic resin mixture can be used as a demulsifier or an intermediate for further preparation of a demulsifier comprising one or more other components commonly used in a demulsifier composition, as understood by those of skill in the art.

As known by one skilled in the art, surfactants, demulsifiers, or dehazers are typically amphiphilic compounds that contain both a hydrophobic portion that is water insoluble (oil-soluble) and a hydrophilic portion that is water-soluble. These alkoxylated phenolic resins can therefore be used for a wide variety of applications for oil and water separation, such as refinery and fuel dehazing. Here, for the alkoxylated phenolic resins, the benzene ring or alkyl/aryl substituted benzene ring portion of the alkoxylated phenolic resins serves as the hydrophobic portion and the ether or ether oligomer portion of the alkoxylated phenolic resins serves as the hydrophilic portion. Thus, both the linear alkoxylated phenolic resin and calixarene alkoxylated phenolic resins in the resulting alkoxylated phenolic resins can be used as components serving demulsifying and dehazing functions. The demulsifier composition comprising the resins or comprising the stabilized phenolic resin mixture prepared by the process discussed above may further act as salt-sequestering agents in crude oil. For instance, the demulsifier composition comprising the resins or comprising the stabilized phenolic resin mixture prepared by the process discussed above may be able to sequester salt from crude oil and as a result, reduce salt levels in crude oil.

These alkoxylated phenolic resins are stable and soluble in aromatic solvents. The resin solution of the alkoxylated phenolic resin can reach a concentration of about 50% to about 75% by weight.

Also, the alkoxylated phenolic resins can be further reacted with chemical agents (e.g., other epoxides, alkylene carbonates, or alkylene oxides) to form a longer chain oligomer of ether (e.g., adding additional unit of ether groups by further reacting the ether group of the alkoxylated phenolic resins with the chemical agent). The resulting product with a longer chain oligomer of ether is known in the art to be an effective demulsifier. Thus, the reaction used in the process for preparing the stabilized phenolic resins will not affect the surfactant properties of the desired demulsifier.

Alternatively, the compounds may be used as charge control agents, where, for example, the compounds may be used as coating additives that can be applied to surfaces (e.g., aluminum oil cans) where they can impart charge control. Charge control agents are used to create a desired charge level and polarity. Charge control agents are also useful in toners for developing electrostatic images used for electrophotography, electrostatic recording, electrostatic printing and other purposes and a charge control agent capable of controlling the amount of charges of the toner. The chargeability of such toners is an important factor in electrostatic latent image developing systems. Thus, to appropriately control the charge amount of toner, a charge control agent providing a positive or negative charge is often added to the toner. This technology is further illustrated in U.S. Pat. No. 5,318,883, which is hereby incorporated by reference.

Host molecules: The compounds may be used as host molecules, where they form a complex or an association between one or more calixarene host molecules and one or more guest molecules. That is, the guest molecule may form a complex with the calixarene by fitting into the cavity of the host. By forming this type of complex, it is envisioned that a wide variety of guest molecules may form a complex with the calixarene. For example, the calixarene may aid in compound delivery (e.g., drug-delivery vehicles) by encapsulating a compound within the cavity, thereby aiding in the solubilization of the guest molecule. In a similar light, the compounds may be used as extractants, where, for example, they may be used to extract small molecules or metal ions (e.g., via chelation). This technology is further illustrated in U.S. Pat. No. 7,524,469, which is hereby incorporated by reference. Similarly, the calixarenes may further act as ionophores, where they can transport the metal ions across cell membranes. This technology is further illustrated in U.S. patent application Ser. No. 13/347,765, which is hereby incorporated by reference.

Resists: The compounds may be used in resist technology. For example, the resist may be used for pattern formation and etching to form a hyperfine structure exemplified in a semiconductor device and a semiconductor integrated circuit. For example the resist may be particularly useful for radioactive ray irradiation exposure. This technology is further illustrated in U.S. Pat. No. 7,514,197, which is hereby incorporated by reference. The calixarenes may be used in positive resists or negative resists. Additional applications of the compounds include the resist to fabricate printed circuit boards, sand carving, microelectronics, and patterning and etching of substrates.

Catalysis: The compounds may be used as catalysts for a variety of chemical reactions. For example, Because of their unique topology, complexes in which a calixarene ligand coordinates to a transition metal are potentially valuable for olefin polymerization. Too often, olefin polymerization catalysts based on chelating ligands have poor activity. This is consistent with an energetically favorable trans-coordination of the olefin and growing polymer chain in an octahedral or pseudo-octahedral configuration of active sites. Ideally, the growing polymer chain and complexed olefin would be forced into closer proximity. The calixarene framework creates such an opportunity because the aromatic rings prevent trans-coordination. This technology is further illustrated in U.S. Pat. No. 6,984,599.

Antifoulants: The compounds may be used as antifoulants, where, for example, they may be applied to surfaces that normally undergo biofouling (e.g., ship hulls), where the compounds may inhibit biofouling, or disperse preexisting biofouling.

Thermal stabilizers: The compounds may be used as thermal stabilizers, where, for example, they may be added to various polymers that normally undergo thermal side-products. The compounds may be used as curing agents, where, for example, they may assist in the curing processes of polymers by aiding in cross-linking.

Additionally, the compounds may be used as accelerators; as additives; as binding agents; as stabilizing agents; as adsorbent/absorbant materials; as sequestering agents; as hardeners, etc.

Another aspect of the invention relates to a method of resolving a water-in-oil or oil-in-water emulsion. The method comprises adding to a water-in-oil or oil-in-water emulsion an effective demulsifying amount of one or more phenolic resins or resin solution discussed above or one or more of the stabilized or solubilized phenolic resins prepared from the process discussed above. The water-in-oil or oil-in-water emulsion can be a broad range of hydrocarbon emulsions encountered in crude oil production, refining, and chemical processing. For instance, the water-in-oil or oil-in-water emulsion can be a crude oil emulsion, a refinery desalting emulsion, or a crude oil production emulsion.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

EXAMPLES

The following examples are given as particular embodiments of the invention and to demonstrate the practice and advantages thereof. It is to be understood that the examples are given by way of illustration and are not intended to limit the specification or the claims that follow in any manner.

Example 1A: Synthesis of a Mixture of Calixarene/Linear Alkylphenolic Resins Based on Para-Tert.-Butylphenol and Para-Nonylphenol A reaction vessel was charged with para-butylphenol and para-nonylphenol, Solvesso™ 150ND solvent (an aromatic solvent commercially available from ExxonMobil Chemicals), and sodium hydroxide. Formalin was added to the reaction mixture over a period of 0.5 to 1.5 hours. The reaction mixture was then heated to reflux and the reaction was completed within 3-4 hours, Solvesso™ 150 solvent was added to the reaction mixture to adjust the percentage of the resulting resins to 53-55 wt %. During the reaction, the product started to precipitate out of the resin solution. The final yield was 97%, and the appearance of the product was a suspension of partially insoluble material.

Samples of the final product were left under room temperature, and placed in the freezer at −25° C. for 24 hours. The insoluble solid precipitate was isolated and weighted.

Example 1B (Comparative): Reaction of Calixarene/Linear Alkylphenolic Resins with Propylene Carbonate A reaction vessel was charged with the resin prepared in Example 1A as described above, and was added to the reaction vessel immediately after the reaction in example 1 was complete, without storage under room temperature or at −25° C. The reaction vessel was heated to 130-140° C. Potassium carbonate was then added. The reaction mixture was stirred and the reaction temperature of the mixture was increased to 170-180° C. Once the reaction temperature reached 170-180° C., propylene carbonate was added slowly. After 3 hours, the reaction was complete.

Samples of the final product from the reaction were left under room temperature, and placed in the freezer at −25° C. for 24 hours. The reaction product showed no precipitate.

Example 1C: Stabilization of the Calixarene with N-Butyl Glycidyl Ether Instead of Propylene Carbonate 80.8 g of the resin prepared in Example 1A, as described above, was added (solid content of 55.13%) in A150ND solvent (0.24 molar equivalents of phenolic hydroxyl units; commercially available from Shell) and 30.4 g of n-butyl glycidyl ether (0.96 molar equivalents of glycidyl ether in relation to the phenolic hydroxyl units) were added to a 250 ml flask equipped with mixing, heat and a reflux condenser. Heat and mixing were started and at 98° C., 0.52 g of 2-methylimidizole was added to the slurry. At 144° C. darkening of the reaction mixture was observed as the reaction product became soluble in the A-150ND solvent. Upon reaching 150° C. the reaction mixture was clear. The clear solution was then held at 150° C. for one hour then cooled and 111.64 g of the reaction product was discharged to a glass jar.

The final product had a viscosity of 426 cP at 25° C. and a MW of 2244, which is higher than the starting resin prepared in Example 1A with a MW of 1593. Due to co-elution with the A-150ND solvent, the % residual n-butyl glycidyl ether was not able to be analyzed by GC, but assumed to be ~2% in the final product based on reaction carried out in A-150 solvent, which does not co-elute with n-butylglycidyl ether (Example 2C). The final product showed no precipitation after being stored for 3 days in the freezer at −25° C.

Example 1D: Stabilization of the Calixarene with a Reduction in the Amount of N-Butyl Glycidyl Ether 78.75 g of the resin prepared in Example 1A as described above, (solid content of 55.13%) was added in A-150ND (0.23 molar equivalents of phenolic hydroxyl units) and 15.25 g of n-butyl glycidyl ether (0.52 molar equivalents of glycidyl ether in relation to the phenolic hydroxyl units) and 0.29 g of 2-methylimidizole were added to a 250 ml flask equipped with mixing, heat and a reflux condenser. Heat and mixing were started and at 150° C. darkening of the reaction mixture was observed as the reaction product became soluble in the A-150ND solvent. Upon reaching 150° C. the reaction mixture was observed to begin clearing. The clear solution was free of any precipitate after 15 minutes. The solution was then held between 148-152° C. for 1.5 hours.

The final product had a MW of 2174 that was higher than the starting resin prepared in Example 1A as described above, with a MW of 1593. Due to co-elution with the A-150ND solvent the % residual n-butyl glycidyl ether was not able to be analyzed by GC, but assumed to be <0.7% in the final product based on reaction carried out in A-150 solvent, which does not co-elute with n-butylglycidyl ether (Example 2C). The final product showed no precipitation after being stored for 3 days in the freezer at −25° C.

Example 1E: Stabilization of the Calixarene Without Using a Catalyst 1000.00 g of the resin prepared in Example 1A as described above (solid content of 55.13%) in A-150ND (2.98 molar equivalents of phenolic hydroxyl units) and 195.00 g of n-butyl glycidyl ether (0.50 molar equivalents of glycidyl ether in relation to the phenolic hydroxyl units) were added to a 2000 ml flask equipped with mixing, heat and a reflux condenser. Heat and mixing were started and at 160° C. and the mixture was held. After 30 darkening of the reaction mixture was observed as the reaction product was becoming soluble in the A-150ND solvent. After an additional two hours the mixture became darker but still not clear. An additional 10.00 g of n-butyl glycidyl ether (0.03 molar equivalents of glycidyl ether in relation to the phenolic hydroxyl units) was added. The solution cleared 30 minutes after the addition. The solution was then held at 160° C. for two hours. The solids content of the solution was determined and the batch was further diluted with 308 g of A-150ND solvent to 47.3%.

The final product had a solids content of 47.3% and was stable after 3 days in the freezer at minus 25° C.

Example 1F: Stabilization of the Calixarene with Neopentyl Glycol Diglycidyl Ether 106 g of the resin prepared in Example 1A as described above (solids content of 54.04%) in A-150ND (0.31 molar equivalents of phenolic hydroxyl units) and 23.1 g of neopentyl glycol diglycidyl ether (0.689 molar equivalents of glycidyl ether in relation to the phenolic hydroxyl units) and 0.25 g of 2-methylimidazole were added to a 250 mL flask equipped with mixing, heat and a reflux condenser. Heat and mixing were started, and at 155° C. darkening of the reaction mixture was observed. After holding at 155° C. for 1.5 hours, the mixture became a clear solution. The clear solution was then held an additional 2 hours at 155° C.

The starting resin had a Mw of 1720 the final reaction product had a Mw of 7493 and the residual neopentyl glycol diglycidyl ether content was 0.35%.

Example 2A: Synthesis of a Mixture of Calixarene/Linear Alkylphenolic Resins Based on Para-Tert-Butylphenol A reaction vessel was charged with para-tert-butylphenol, Solvesso™ 150 solvent, and sodium hydroxide. Formalin was added to the reaction mixture over 0.5-1.5 hours. The reaction mixture was then heated to reflux. Once the reaction was complete, and the reaction was completed within 3-4 hours, Solvesso™ 150 solvent was added to the reaction mixture to adjust the percentage of the resulting resins to 53-55%. During the reaction, the product started to precipitate out of the resin solution. The final yield was 97%, and the appearance of the product was a suspension of partially insoluble material.

Example 2B: Reaction of Calixarene/Linear Alkylphenolic Resins with Propylene Carbonate (Comparative)

A reaction vessel was charged with the resin prepared in Example 2A, as described above (containing 53-55% resulting resins). This resin was added to the reaction vessel immediately after the reaction from the previous example was complete, without storage under room temperature or at −25° C. The reaction vessel was heated to 130-140° C. Potassium carbonate was then added. The reaction mixture was stirred and the reaction temperature of the mixture was increased to 170-180° C. Once the reaction temperature reached 170-180° C., propylene carbonate was added slowly. After 3 hours, the reaction was complete.

Samples of the final product from the reaction were left under room temperature, and placed in the freezer at −25° C. for 24 hours. This preparation was not stable and solids had precipitated out of the reaction mass.

Example 2C: Stabilization of the Calixarene with N-Butyl Glycidyl Ether Instead of Propylene Carbonate 300.00 g of reaction mass from of the resin prepared in Example 2A, as described above (solid content of 50.1%) in A-150 (which does not co-elute with the n-butylglycidyl ether) (0.93 molar equivalents of phenolic hydroxyl units) and 115.00 g of n-butyl glycidyl ether (0.95 molar equivalents of glycidyl ether in relation to the phenolic hydroxyl units) and 1.00 g of 2-methylimidazole were added to a 1000 ml flask equipped with mixing, heat and a reflux condenser. Heat and mixing were started and at 150° C. the mixture was observed to darken as the reaction product became soluble in the A-150 solvent. Upon reaching 150° C. the reaction mixture was observed to begin clearing. The clear solution was free of any precipitation after 15 minutes. The solution was then held at 148-152° C. for two hours taking samples every 15 minutes then cooled and 388.0 g of the reaction product was discharged to a glass jar. Eight samples were taken during the hold for analysis total weight in samples was 14.0 g and 11 g of product was cleaned from the flask. Total recovered was 99.30% of theoretical.

| Sample number | % n-butyl glycidyl ether |
|---|---|
| 2C-1 | 13.47 |
| 2C-2 | 4.89 |
| 2C-3 | 2.73 |
| 2C-4 | 1.35 |
| 2C-5 | 0.96 |
| 2C-6 | 0.77 |
| 2C-7 | 0.58 |
| 2C-8 | 0.62 |
| 2C-Final | 0.56 |

The final product showed no precipitation after being stored for 3 days in the freezer at −25° C.

Although preferred embodiments have been depicted and described in detail herein, it will be apparent to those skilled in the art that various modifications, additions, substitutions, and the like can be made without departing from the spirit of the invention and these are therefore considered to be within the scope of the invention as defined in the claims which follow.

We claim:

1. A process for stabilizing or solubilizing a phenolic resin mixture, comprising:
reacting a phenolic resin mixture comprising linear phenolic resins and calixarene compounds having pendant phenolic hydroxyl groups with one or more compounds of formula (III):

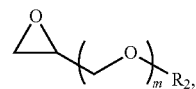

an optional catalyst, and at least one hydrocarbon solvent at an elevated temperature for a period of time sufficient to alkoxylate one or more of the phenolic hydroxyl groups of the linear phenolic resins and/or calixarene compounds in the phenolic resin mixture to result in a resin solution substantially free of undissolved solid components, wherein the solubility of the phenolic resin mixture is increased by at least 20% compared to a phenolic resin mixture that is not subjected to said reacting step,
wherein
$R_2$ is a H, $C_1$ to $C_{20}$ branched or unbranched alkyl which may optionally be substituted with one or more glycidyl ether units of the formula

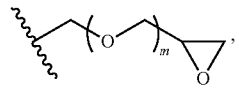

$C_2$ to $C_{10}$ alkenyl, or $C_5$ to $C_{10}$ aryl; and
m is an integer from 0 to 10.

2. The process of claim 1, wherein, on average, about 0.1 to about 20 moles of the compounds of formula (III) are added to react with each mole of the phenolic units of the phenolic resin.

3. The process of claim 1, wherein the catalyst is present and is selected from the group consisting of sodium hydroxide, potassium hydroxide, sodium carbonate, potassium carbonate, sodium bicarbonate, potassium bicarbonate, triethylamine, imidazole, 2-methylimidazole, pyridine, and combinations thereof.

4. The process of claim 1, wherein the elevated temperature is in the range of 110-170° C.

5. The process of claim 1, wherein less than 5% of residual compound of formula (III) remains unreacted within 1 hour of the addition of the compound of formula (III).

6. The process of claim 1, wherein $R_2$ is selected from the group consisting of hydrogen, methyl, ethyl, n-propyl, iso-propyl, n-butyl, iso-butyl, tert-butyl, allyl, ethylhexyl, octyl, nonyl, decyl, phenyl, nonylphenyl, and hexadecyl; or is a $C_1$ to $C_{20}$ branched or unbranched alkyl substituted with one or more glycidyl ether units of the formula

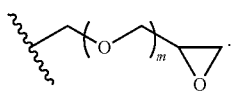

7. The process of claim 6, wherein $R_2$ is n-butyl or

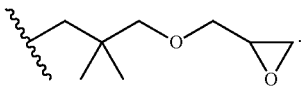 [SMILES: *CC(C)(C)COCC1CO1]

8. The process of claim 1, wherein the calixarene compounds comprise 4-20 units of formula (II):

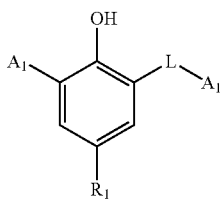

(II)

wherein
each $R_1$ is independently a H, $C_1$ to $C_{30}$ alkyl, phenyl, or arylalkyl;

each L is independently selected from the group consisting of —$CH_2$—, —C(O)—, —$CH(R_3)$—, —$(CH_2)_n$—O—$(CH_2)_n$—, and —$C(R_3)_2$—;

each $R_3$ is independently a $C_1$-$C_6$ alkyl;

each n is independently an integer from 1 to 2;

each $A_1$ represents a direct covalent bond to an adjacent unit of formula (II) such that there is one L group between adjacent units, whereby the total units in the calixarene compound form a ring.

9. The process of claim 8, wherein each $R_1$ is independently a $C_4$ to $C_{12}$ or $C_{24}$ to $C_{28}$ alkyl.

10. The process of claim 8, wherein the total number of units in the calixarene compounds is from 4 to 8.

11. The process of claim 1, wherein less than 10% of solid components precipitate out of the solvent after the storage of 24 hours or longer.

12. A stabilized or solubilized phenolic resin prepared from the process of claim 1.

13. The process of claim 1, wherein the m integer recitation includes the proviso that when m is 0, each $R_2$ is independently $C_5$ to $C_{10}$ aryl.

14. The process of claim 1, wherein each m is 0 or 1.

15. The process of claim 14, wherein each m is 1.

16. The process of claim 14, wherein each m is 0.

17. The process of claim 13, wherein each m is 0.

18. The process of claim 9, wherein each $R_1$ is independently tert-butyl, nonyl, or tert-octyl.

* * * * *